Figure 1:
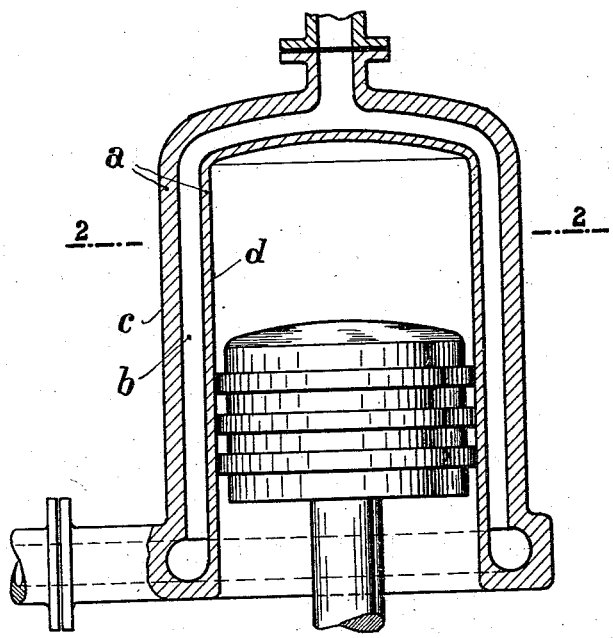

E. HURLBRINK.
COMBUSTION ENGINE.
APPLICATION FILED MAR. 30, 1914.

1,244,333.

Patented Oct. 23, 1917.

Witnesses:

Inventor:
Ernst Hurlbrink,

# UNITED STATES PATENT OFFICE.

ERNST HURLBRINK, OF BERLIN-FRIEDENAU, GERMANY.

COMBUSTION-ENGINE.

1,244,333.  Specification of Letters Patent.  Patented Oct. 23, 1917.

Application filed March 30, 1914. Serial No. 828,154.

*To all whom it may concern:*

Be it known that I, ERNST HURLBRINK, a subject of the Emperor of Germany, residing in Berlin-Friedenau, Germany, have invented certain new and useful Improvements in Combustion-Engines, of which the following is a specification.

The invention relates to a device for use in internal combustion engines of great horse-power and adapted to lessen the quantity of the cooling water by enabling the cooling water to be heated up to boiling point and with pressure even above 100° C. In combustion engines of great horse-power and particularly in high pressure two-stroke cycle engines, the usual arrangement of the cooling water jacket does not enable the cooling water to assume a relatively high exit temperature.

In high pressure two-stroke cycle engines of great horse-power, it is necessary in view of the large cylinder diameter, the high pressure prevailing in the cylinder and the great heating of the cylinder wall, to make the thickness of the cylinder wall unproportionately great. The usual external cooling of this cylinder wall brings about between the inside and the outside thereof a fall in temperature of about 50° C. per cm. thickness so that the outside of the cylinder wall has a much lower temperature than the inside thereof.

In large engines, moreover, the circumference of the cylinder and consequently the cooling surface becomes small in relation to the amount of heat to be given off. This fact, jointly with the fall in temperature above referred to between the inner and outer face of the cylinder wall, renders it necessary for as large a fall in temperature as possible to prevail between the cooled outer face of the cylinder wall and the cooling water so that the latter leaves the cooling jacket at as low a temperature as possible. The low final temperature of the cooling water, however, can only be attained by very large water quantities traversing the cooling jacket in the unit of time. A further increase of the cooling water volume is caused by the fact that in consequence of the low temperature differences prevailing within the cooling water jacket a very energetic water circulation must be provided for.

Although the provision of large quantities of cooling water is highly uneconomical in itself, in engine plants with a closed cooling water circulation, particularly in the case of engines for driving vehicles such as locomotives or ships, a main difficulty to be added is the question of the return cooling of relatively large water quantities which as compared with the surroundings have only a relatively small temperature difference whereby it is necessary during the return cooling in accordance with the great power in question to deprive the cooling water of very large heat quantities with a small fall of temperature. This necessitates large cooling surfaces, that is to say, cumbersome return cooling arrangements. For a given limited space, therefore, the return cooling could not be extended too far and consequently the cooling action of the engine would be reduced and a further increase of the cooling water would be necessary so that in fact the realization of such a plant would encounter almost unsurmountable difficulties.

This drawback according to this invention is obviated by sub-dividing the cooling water into a large number of streams passing along the cylinder wall in proximity to the inner surface of the cylinder so that ribs are established between the individual cooling water passage reinforcing the relatively thin inner part of the cylinder wall against the relatively thick outer part thereof.

The first object attained by this arrangement is that the water cooling takes place so close to the hottest parts of the cylinder wall that the fall in temperature effected by the thickness of the cylinder wall is very slight and that the temperature difference between the cooling water and the walls in contact therewith remains sufficiently great for attaining an efficient cooling even if the water is heated up to boiling temperature and also if the temperature of the water is raised above 100° C. by subjecting the cooling chambers in the cylinder wall to pressure.

By heating the whole quantity of the water forced through the cooling chambers up to boiling temperature and also owing to the fact that a part of the cooling water is capable of evaporation the cooling water is fully utilized whereby the quantity of the cooling water to be supplied may be reduced to the theoretically possible minimum. This small quantity of cooling water, however, passes through the narrow cooling passages at a relatively high speed, thus preventing the settling of mud which in the great heating of the water would otherwise cause difficulties.

By heating the water to boiling temperature the return cooling of the cooling water is facilitated because the fall in temperature by means of which the cooling water is deprived of the heat is as great as pssible; the water quantity to be overcome in the return cooling, however, is very small so that the return cooling arrangement may also be applied to vehicles.

Figure 2:
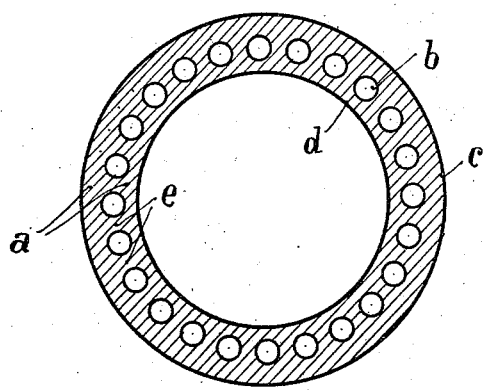

Figures 1 and 2 of the drawing illustrate by way of example a constructional form of the invention in a vertical and transverse section respectively.

The cooling water is divided into thin streams or strands passing through cooling passages $b$ in the cylinder wall $a$, which passages are arranged as close as possible to the inner face of the cylinder wall so that only a thin web $d$ remains between the cooling passages and the inner face of the cylinder. This web is supported or reinforced against the outer wall $c$ by the ribs $e$ which remain between the passages $b$ as shown. The passages $b$ extend nearly parallel to the cylinder axis along the whole cylinder wall and if desired may be extended even into the cylinder cover.

The cooling passages $b$ may be produced either by drilling or casting or by the provision in the interior of the cylinder $c$ equipped with the ribs $e$ of a separate smooth bushing $d$, as will be readily understood.

What I claim and desire to secure by Letters Patent is:—

1. In an internal combustion engine, in combination, a cylinder body; a cylinder head thereon; and cooling means consisting of a series of non-communicating water passages extending longitudinally of the cylinder body and radially of the cylinder head from its center to its periphery, all of said passages being located within the thickness of the cylinder wall.

2. In an internal combustion engine, in combination, a cylinder body containing a cylinder chamber; a cylinder head; a series of individual water passages extending longitudinally of said cylinder body throughout the length of said cylinder chamber and radially of said cylinder head from the latter's periphery to its center, all of said passages being located within the thickness of the cylinder wall; an annular passage into which the lower ends of said passages open; and a passage directed substantially axially of said cylinder and into which the upper ends of said water passages open.

3. In an internal combustion engine, in combination, a cylinder body; a cylinder head; and cooling means consisting of a series of non-communicating water passages forming a water jacket and extending longitudinally of the cylinder and radially of the cylinder head, within the thickness of the cylinder wall; a thin wall separating said passages from the interior of the cylinder; and a thick wall inclosing said passages from the outside.

4. In an internal combustion engine, in combination, a cylinder body containing a combustion chamber; a cylinder head; a series of individual water passages extending longitudinally of said cylinder body throughout the length of said combustion chamber and radially of said cylinder head from the latter's marginal portion to its center, all of said passages being located within the thickness of the cylinder wall in close proximity to the inner surface of the cylinder; an annular passage into which the lower ends of said passages open; and a passage directed substantially axially of said cylinder and into which the upper ends of said water passages open.

5. In an internal combustion engine, in combination, a cylinder; a combustion chamber within said cylinder; and cylinder cooling means, comprising a series of non-communicating water passages forming a water jacket and extending longitudinally of said cylinder within the thickness of the cylinder wall; a thin wall separating said water passages from the interior of said cylinder; and a thick wall inclosing said passages from the outside.

6. In an internal combustion engine, in combination, a cylinder, and cylinder head closing said cylinder at one end, said head and the lateral walls of the cylinder forming a combustion chamber within the latter; and cylinder cooling means comprising water passages extending longitudinally of said cylinder within the thickness of the lateral wall of the cylinder, in close proximity to the inner surface of said lateral wall and all around and throughout the length of said combustion chamber, and radial water passages provided within the thickness of said cylinder head, and extending throughout its entire area and in close proximity to its inner surface.

7. In an internal combustion engine, in combination, a cylinder having relatively thick walls; a combustion chamber within said cylinder; and cylinder cooling means comprising water passages provided within the thickness of the lateral wall of the cylinder all around said combustion chamber, in close proximity to the inner surface of said cylinder and closer to the latter surface than to the outer surface of said cylinder, all of said passages extending longitudinally of said cylinder throughout the length of said combustion chamber.

8. In an internal combustion engine, in combination, a cylinder, and cylinder head closing said cylinder at one end, said head and the lateral walls of the cylinder being relatively thick and forming a combustion chamber within said cylinder; and cylinder cooling means comprising water passages extending longitudinally of said cylinder within the thickness of the lateral wall of the latter, in close proximity to the inner surface of said lateral wall and all around and throughout the length of said combustion chamber, and radial water passages provided within the thickness of said cylinder head and extending throughout its entire area in close proximity to its inner surface, all of said passages being located closer to the inner than to the outer surfaces of said cylinder and cylinder head.

In testimony whereof I have affixed my signature in presence of two witnesses.

ERNST HURLBRINK.

Witnesses:
WOLDEMAR HAUPT,
HENRY HASPER.